(12) United States Patent
Sone et al.

(10) Patent No.: US 11,161,919 B2
(45) Date of Patent: Nov. 2, 2021

(54) METAL-CONTAINING OXIDIZED CELLULOSE NANOFIBER DISPERSION AND METHOD OF PRODUCING THE SAME

(71) Applicants: ZEON CORPORATION, Tokyo (JP); THE UNIVERSITY OF TOKYO, Tokyo (JP)

(72) Inventors: Atsushi Sone, Tokyo (JP); Akira Isogai, Tokyo (JP)

(73) Assignees: ZEON CORPORATION, Tokyo (JP); THE UNIVERSITY OF TOKYO, Tokyo (JP)

(*) Notice: Subject to any disclaimer, the term of this patent is extended or adjusted under 35 U.S.C. 154(b) by 45 days.

(21) Appl. No.: 16/232,234

(22) Filed: Dec. 26, 2018

(65) Prior Publication Data
US 2019/0127491 A1 May 2, 2019

Related U.S. Application Data

(62) Division of application No. 15/546,368, filed as application No. PCT/JP2016/000581 on Feb. 4, 2016, now abandoned.

(30) Foreign Application Priority Data
Feb. 4, 2015 (JP) ................. 2015-020422

(51) Int. Cl.
C08B 15/04 (2006.01)
C08L 1/04 (2006.01)
C08J 3/03 (2006.01)
D21H 11/20 (2006.01)

(52) U.S. Cl.
CPC ............... *C08B 15/04* (2013.01); *C08J 3/03* (2013.01); *C08L 1/04* (2013.01); *D21H 11/20* (2013.01); *C08J 2301/04* (2013.01)

(58) Field of Classification Search
None
See application file for complete search history.

(56) References Cited

U.S. PATENT DOCUMENTS

| 2010/0233481 A1 | 9/2010 | Akira et al. |
| 2011/0262731 A1 | 10/2011 | Kenta et al. |
| 2012/0000392 A1 | 1/2012 | Kenta et al. |
| 2015/0027648 A1 | 1/2015 | Shiho et al. |

FOREIGN PATENT DOCUMENTS

| CN | 102264766 A | 11/2011 |
| CN | 102264822 A | 11/2011 |
| EP | 2816646 A1 | 12/2014 |
| JP | 2006160842 A | 6/2006 |
| JP | 2008001728 A | 1/2008 |
| JP | 2010168573 A | 8/2010 |
| JP | 2010202856 A | 9/2010 |
| JP | 2012001626 A | 1/2012 |
| JP | 2012126787 A | 7/2012 |
| WO | 2007140573 A1 | 12/2007 |
| WO | 2009069641 A1 | 6/2009 |
| WO | 2010086616 A1 | 8/2010 |
| WO | 2010095574 A1 | 8/2010 |
| WO | 2011074301 A1 | 6/2011 |
| WO | 2012119229 A1 | 9/2012 |
| WO | 2013137140 A1 | 9/2013 |

OTHER PUBLICATIONS

JP 2014070158 machine translation (Year: 2014).*
JP2013104133 machine translation (Year: 2013).*
Mitsuharu et al (JP 2014070158, wherein a machine translation is provided) (Year: 2014).*
Yosuke et al (JP2013104133, wherein a machine translation is provided) (Year: 2013).*
Homma et al (Effects of carboxyl-group counter-ions on biodegradation behaviors of TEMPO-oxidized cellulose fibers and nanofibril films. Cellulose (2013) 20:2505-2515). (Year: 2013).*
Akira Isogai, "Preparation and Characterization of TEMPO-Oxidized Cellulose Nanofibers", The University of Tokyo Nogakubu Enshurin Hokoku, 2011, pp. 1-43, vol. 126.
Aug. 14, 2018, The Extended European Search Report issued by the European Patent Office in the corresponding European Patent Application No. 16746328.0.
Aug. 8, 2017, International Preliminary Report on Patentability issued in the International Patent Application No. PCT/JP2016/000581.
Hayaka Fukuzumi, et al., Thermal stabilization of TEMPO-oxidized cellulose, Polymer Degradation and Stability, 2010, pp. 1502-1508, vol. 95.
Isogai et al (TEMPO-oxidized cellulose nanofibers. Nanoscale, 3, pp. 71-85 (2011)).
Isogai, A. et al., "Viscosity Measurements of Cellulose/SO2-Amine-Dimethylsulfide Solution", Sen-I Gakkaishi, 1989, pp. 299-306, vol. 45, No. 7.
Mar. 15, 2016, International Search Report issued in the International Patent Application No. PCT/JP2016/000581.
Mitsuharu et al. (JP2014-070158, machine translation (2014)). (Year: 2014).
T. Saito, et al., Ion-exchange behavior of carboxylate groups in fibrous cellulose oxidized by the TEMPO-mediated system, Carbohydrate Polymers, 2005, pp. 183-190, vol. 61 Iss.2.

* cited by examiner

*Primary Examiner* — Jake M Vu
(74) *Attorney, Agent, or Firm* — Kenja IP Law PC

(57) ABSTRACT

Disclosed is a dispersion of metal-containing oxidized cellulose nanofibers with superior dispersibility, which is applicable to various uses. The disclosed metal-containing oxidized cellulose nanofiber dispersion comprises a dispersion medium, and metal-containing oxidized cellulose nanofibers containing a metal other than sodium in salt form, wherein the metal-containing oxidized cellulose nanofibers have a number-average fiber diameter of 100 nm or less and an average degree of polymerization of 100 to 2,000.

6 Claims, No Drawings

METAL-CONTAINING OXIDIZED CELLULOSE NANOFIBER DISPERSION AND METHOD OF PRODUCING THE SAME

CROSS-REFERENCE TO RELATED APPLICATION

This application is a divisional application of U.S. application Ser. No. 15/546,368 filed Jul. 26, 2017, which is a National Stage Application of PCT/JP2016/000581 filed Feb. 4, 2016, which claims priority based on Japanese Patent Application No. 2015-020422 filed Feb. 4, 2015. The disclosures of the prior applications are hereby incorporated by reference herein in their entirety.

TECHNICAL FIELD

The present disclosure relates to metal-containing oxidized cellulose nanofiber dispersions and methods of producing the same.

BACKGROUND

Methods of producing a dispersion have heretofore been proposed wherein native cellulose is oxidized in the presence of an oxidizing catalyst such as N-oxyl compound and the resulting oxidized cellulose is subjected to mechanical dispersing treatment to prepare a dispersion in which highly crystalline ultrafine fibers (oxidized cellulose nanofibers) with several nanometer diameters are dispersed in a dispersion medium such as water (see, e.g., PTL 1). Oxidized cellulose nanofiber dispersions produced by such production methods comprise individual strands of oxidized cellulose nanofiber separated from one another in the dispersion medium and are expected to be applied to various uses such as composite materials.

CITATION LIST

Patent Literature

PTL 1: JP2008-1728A

SUMMARY

Technical Problem

It is important to further improve the performance of oxidized cellulose nanofibers according to the intended application when they are applied to various uses such as composite materials.

Thus, for practical uses of oxidized cellulose nanofibers, there has been a need in the art to provide a technique of imparting desired characteristics to the oxidized cellulose nanofibers while retaining their dispersibility.

Solution to Problem

The inventors made extensive studies to provide a technique of imparting desired characteristics to oxidized cellulose nanofibers while retaining their dispersibility. The inventors focused on the fact that the above-described conventional method of producing an oxidized cellulose nanofiber dispersion involves the use of sodium hypochlorite and sodium bromide as a co-oxidizing agent upon oxidation of native cellulose in the presence of an oxidizing catalyst, so that the primary hydroxyl groups at C6 of the β-glucose units (building blocks of cellulose) of the oxidized cellulose nanofibers in the resulting dispersion are oxidized to sodium carboxylate groups (sodium salts of carboxyl groups). Further, the inventors conceived a new idea of imparting desired characteristics to oxidized cellulose nanofibers by substituting the sodium ion part of the sodium carboxylate of the oxidized cellulose nanofibers by an ion of a metal other than sodium to form metal-containing oxidized cellulose nanofibers containing a metal other than sodium in salt form. The inventors then made studies and established that it is possible to provide a dispersion containing well-dispersed metal-containing oxidized cellulose nanofibers containing a metal other than sodium in salt form, by contacting oxidized cellulose nanofibers dispersed in a dispersion medium with a salt containing a metal other than sodium. The inventors completed the present disclosure based on these findings.

Specifically, the present disclosure is aimed at advantageously solving the foregoing problem, and the disclosed metal-containing oxidized cellulose nanofiber dispersion comprises a dispersion medium, and metal-containing oxidized cellulose nanofibers containing a metal other than sodium in salt form, wherein the metal-containing oxidized cellulose nanofibers have a number-average fiber diameter of 100 nm or less.

In such a dispersion which comprises metal-containing oxidized cellulose nanofibers having a number-average fiber diameter of 100 nm or less and containing a metal other than sodium in salt form, the metal-containing oxidized cellulose nanofibers exhibit superior dispersibility, and appropriate selection of the type of the metal contained in salt form allows desired characteristics to be imparted to the metal-containing oxidized cellulose nanofibers. Thus, when the dispersion is used for example to form composite material, it is possible to allow the composite material to show desired characteristics even when the blended amount is small.

The present disclosure is also aimed at advantageously solving the foregoing problem, and a first disclosed method of producing a metal-containing oxidized cellulose nanofiber dispersion includes contacting oxidized cellulose nanofibers containing a first metal in salt form, dispersed in a solvent, with a salt of a second metal other than the first metal to provide metal-containing oxidized cellulose nanofibers containing the second metal in salt form, wherein the metal-containing oxidized cellulose nanofibers have a number-average fiber diameter of 100 nm or less.

Contacting oxidized cellulose nanofibers containing a first metal in salt form, dispersed in a solvent, with a salt of a second metal as described above allows for easy production of a dispersion of metal-containing oxidized cellulose nanofibers containing the second metal in salt form and having a number-average fiber diameter of 100 nm or less.

The present disclosure is also aimed at advantageously solving the foregoing problem, and a second disclosed method of producing a metal-containing oxidized cellulose nanofiber dispersion includes contacting oxidized cellulose nanofibers containing a first metal in salt form, dispersed in a solvent, with a strong acid to substitute ions of the first metal contained in salt form by hydrogen atoms; and contacting the oxidized cellulose nanofibers in which the ions of the first metal have been substituted by hydrogen atoms, dispersed in a solvent, with a salt of a second metal other than the first metal to provide metal-containing oxidized cellulose nanofibers containing the second metal in salt form, wherein the metal-containing oxidized cellulose nanofibers have a number-average fiber diameter of 100 nm or less.

Contacting oxidized cellulose nanofibers in which ions of a first metal have been substituted by hydrogen atoms, dispersed in a solvent, with a salt of a second metal as described above can efficiently promote the substitution reaction of the first metal and therefore allows for efficient production of a dispersion of metal-containing oxidized cellulose nanofibers containing the second metal in salt form and having a number-average fiber diameter of 100 nm or less.

In the present disclosure, the "number-average fiber diameter" of metal-containing oxidized cellulose nanofibers can be found by measuring the fiber diameters of 5 or more metal-containing oxidized cellulose nanofibers using an atomic force microscope, and calculating the number average of measured fiber diameters. Specifically, the "number-average fiber diameter" of metal-containing oxidized cellulose nanofibers can be found for example using the measurement method described in Examples disclosed herein.

In the present disclosure, the oxidized cellulose nanofibers are preferably carboxylated cellulose nanofibers, and the metal-containing oxidized cellulose nanofibers are preferably metal-containing carboxylated cellulose nanofibers.

Metal-containing carboxylated cellulose nanofibers produced using carboxylated cellulose nanofibers exhibit superior dispersibility and sufficiently allow composite material and the like to show desired characteristics even when the blended amount is small.

In the present disclosure, the metal-containing oxidized cellulose nanofibers preferably have a number-average fiber length of 50 nm to 2,000 nm. When the number-average fiber length of the metal-containing oxidized cellulose nanofibers is 50 nm to 2,000 nm, it is possible to impart sufficiently high mechanical strength to composite material and the like while ensuring dispersibility.

In the present disclosure, the "number-average fiber length" of the metal-containing oxidized cellulose nanofibers can be found by measuring the fiber lengths of 5 or more metal-containing oxidized cellulose nanofibers using an atomic force microscope, and calculating the number average of measured fiber lengths. Specifically, the "number-average fiber length" of metal-containing oxidized cellulose nanofibers can be found for example using the measurement method described in Examples disclosed herein.

In the present disclosure, the metal-containing oxidized cellulose nanofibers preferably have an average degree of polymerization of 100 to 2,000. When the average degree of polymerization of the metal-containing oxidized cellulose nanofibers is 100 to 2,000, it is possible to impart sufficiently high mechanical strength to composite material and the like while ensuring dispersibility.

In the present disclosure, the "average degree of polymerization" of the metal-containing oxidized cellulose nanofibers can be found by the viscosity method.

In the disclosed metal-containing oxidized cellulose nanofiber dispersion, the metal other than sodium is preferably at least one metal selected from the group consisting of metals of Group 2 to Group 14 in Period 3 to Period 6 of the long periodic table, more preferably at least one metal selected from the group consisting of magnesium, aluminum, calcium, titanium, chromium, manganese, iron, cobalt, nickel, copper, zinc, silver, tin, barium, and lead, even more preferably at least one metal selected from the group consisting of aluminum, calcium, iron, cobalt, copper, zinc, and silver.

In the disclosed method of producing a dispersion, it is preferred that the first metal is sodium and the second metal is at least one metal selected from the group consisting of metals of Group 2 to Group 14 in Period 3 to Period 6 of the long periodic table, more preferably at least one metal selected from the group consisting of magnesium, aluminum, calcium, titanium, chromium, manganese, iron, cobalt, nickel, copper, zinc, silver, tin, barium, and lead, even more preferably at least one metal selected from the group consisting of aluminum, calcium, iron, cobalt, copper, zinc, and silver.

The use of these metals allows desired characteristics to be imparted to the metal-containing oxidized cellulose nanofibers.

In the disclosed metal-containing oxidized cellulose nanofiber dispersion, the dispersion medium is preferably water.

Also in the disclosed method of producing a dispersion, the solvent is preferably water.

The use of water as the dispersion medium or solvent allows the metal-containing oxidized cellulose nanofibers to be well dispersed in the dispersion.

Advantageous Effect

According to the present disclosure, it is possible to provide a dispersion of metal-containing oxidized cellulose nanofibers with superior dispersibility, which is applicable to various uses.

DETAILED DESCRIPTION

The present disclosure will be described in detail below.

The disclosed method of producing a metal-containing oxidized cellulose nanofiber dispersion can be used for example to produce the disclosed metal-containing oxidized cellulose nanofiber dispersion. The metal-containing oxidized cellulose nanofiber dispersion produced using the disclosed method of producing a metal-containing oxidized cellulose nanofiber dispersion is suitably used in various applications, including formation of composite materials. The following describes the disclosed method of producing a metal-containing oxidized cellulose nanofiber dispersion and the disclosed metal-containing oxidized cellulose nanofiber dispersion which may be produced using the method.

(Method of Producing Metal-Containing Oxidized Cellulose Nanofiber Dispersion)

Using oxidized cellulose nanofibers containing a first metal in salt form as a raw material, the disclosed production method uses either one of the following methods (i) and (ii) to substitute ions of the first metal of the oxidized cellulose nanofibers by ions of a second metal to produce a dispersion of metal-containing oxidized cellulose nanofibers containing the second metal in salt form and having a number-average fiber diameter of 100 nm or less:

Method (i): oxidized cellulose nanofibers containing a first metal in salt form, dispersed in a solvent, are contacted with a salt of a second metal other than the first metal (first production method); and Method (ii): oxidized cellulose nanofibers containing a first metal in salt form, dispersed in a solvent, are contacted with a strong acid to substitute ions of the first metal contained in salt form by hydrogen atoms, after which the oxidized cellulose nanofibers in which the ions of the first metal have been substituted by hydrogen atoms, dispersed in a solvent, are contacted with a salt of a second metal other than the first metal (second production method).

<First Production Method>

In the first production method, oxidized cellulose nanofibers containing a first metal in salt form, dispersed in a solvent, are contacted with a salt of a second metal other than the first metal to substitute at least some, preferably all, of the ions of the first metal of the oxidized cellulose nanofibers by ions of the second metal (metal substitution step). The metal-containing oxidized cellulose nanofibers containing the second metal in salt form obtained from the metal substitution step are then optionally washed (washing step), and further dispersed in a dispersion medium (dispersing step) to afford a dispersion of metal-containing oxidized cellulose nanofibers dispersed in the dispersion medium, the metal-containing oxidized cellulose nanofibers containing the second metal in salt form and having a number-average fiber diameter of 100 nm or less,.

[Metal Substitution Step]

For the oxidized cellulose nanofibers containing a first metal in salt form which may be used in the metal substitution step, any oxidized cellulose nanofibers can be used as long as they are obtainable by oxidation of cellulose and contain the first metal in salt form, e.g., oxidized cellulose nanofibers disclosed in WO2011/074301 can be used. In particular, it is preferred to use carboxylated cellulose nanofibers containing the first metal in salt form. The use of carboxylated cellulose nanofibers results in a dispersion of metal-containing oxidized cellulose nanofibers having superior dispersibility.

Any carboxylated cellulose nanofibers containing the first metal in salt form can be used. For example, carboxylated cellulose nanofibers in which the primary hydroxyl groups at C6 of the β-glucose units (building blocks of cellulose) are selectively oxidized can be used. Examples of methods of selectively oxidizing the primary hydroxyl groups at C6 of the β-glucose units include oxidation methods that use N-oxyl compounds as an oxidation catalyst, such as TEMPO-catalyzed oxidation described below.

In TEMPO-catalyzed oxidation, native cellulose as a raw material is oxidized in an aqueous medium by the action of an oxidizing agent using TEMPO (2,2,6,6-tetramethyl-1-piperidine-N-oxyl) or a derivative thereof as an oxidation catalyst. The native cellulose subjected to the oxidation treatment is then optionally washed and then dispersed in an aqueous medium such as water to afford an aqueous dispersion of cellulose nanofibers having a number-average fiber diameter of, for example, 100 nm or less, preferably 10 nm or less, and having a group in the form of carboxylate (carboxylated cellulose nanofibers).

Native cellulose usable as the raw material can be purified cellulose isolated from cellulose biosynthesis system, such as a plant, animal or bacteria-producing gel. Specific examples include cellulose isolated from coniferous wood pulp, deciduous wood pulp, cotton-based pulp such as cotton linter or cotton lint, non-wood-based pulp such as pulp from barley or bagasse pulp, bacterial cellulose, cellulose isolated from sea squirt, and cellulose isolated from sea grass.

From the perspective of increasing the efficiency of the oxidation reaction and thus the productivity of carboxylated cellulose nanofibers, isolated, purified native cellulose may be subjected to beating or other treatment to increase the surface area. Further, it is preferred to use never-dried native cellulose that has been stored in a never-dried state after isolation and purification, since by doing so, bundles of microfibrils are kept in a state that allows for easy swelling, thereby improving the oxidation reaction efficiency and facilitating the production of carboxylated cellulose nanofibers with small fiber diameters.

TEMPO derivatives usable as oxidation catalysts include those having various functional groups at C4 of 2,2,6,6-tetramethyl-1-piperidine-N-oxyl (TEMPO). Examples of TEMPO derivatives include 4-acetamido-TEMPO, 4-carboxy-TEMPO, and 4-phosphonoxy-TEMPO. High reaction rate can be attained especially when TEMPO or 4-acetamido-TEMPO is used as an oxidation catalyst.

Examples of oxidizing agents include hypohalous acids or salts thereof (e.g., hypochlorous acid or salt thereof, hypobromous acid or salt thereof, and hypoiodous acid or salt thereof); halous acids or salts thereof (e.g., chlorous acid or salt thereof, bromous acid or salt thereof, and iodous acid or salt thereof); perhalogen acids or salts thereof (e.g., perchloric acid or salt thereof, and periodic acid or salt thereof); halogens (e.g., chlorine, bromine, and iodine); halogen oxides (e.g., ClO, $ClO_2$, $ClO_2O_6$, $BrO_2$, and $Br_3O_7$); nitrogen oxides (e.g., NO, $NO_2$, and $N_2O_3$); and peracids (e.g., hydrogen peroxide, peracetic acid, persulfuric acid, and perbenzoic acid). These oxidizing agents can be used alone or in combination, and also can be used in combination with oxidizing enzymes such as laccase.

Depending on the type of the oxidizing agent, bromide or iodide may be combined with the oxidizing agent for use as a co-oxidizing agent. For example, ammonium salts (ammonium bromide, ammonium iodide), alkali metal bromides or iodides, and alkaline earth metal bromides or iodides can be used. These bromides and iodides can be used alone or in combination.

When a metal salt has been used as the oxidizing agent during TEMPO-catalyzed oxidation, generally, the metal constituting the metal salt is contained in salt form in the resulting carboxylated cellulose nanofibers. That is, the metal constituting the metal salt is the first metal.

Among the oxidizing agents described above, it is preferred to use a sodium salt from the perspective of increasing the oxidation reaction rate, with sodium hypochlorite being more preferred, and a co-oxidizing agent of sodium hypochlorite and sodium bromide being particularly preferred. When a sodium salt has been used as the oxidizing agent, generally, carboxylated cellulose nanofibers containing sodium in salt form as the first metal are obtained.

Any condition and method known in the art used for TEMPO-catalyzed oxidation can be employed for the oxidation treatment. In the oxidation treatment, the primary hydroxyl groups at C6 of the β-glucose units are oxidized via aldehyde groups to carboxyl groups. From the perspective of imparting sufficient levels of desired characteristics to metal-containing oxidized cellulose nanofibers obtained from the raw material carboxylated cellulose nanofibers, the proportion of the primary hydroxyl groups oxidized to carboxyl groups is preferably 50 mol % or more, more preferably 70 mol % or more, even more preferably 90 mol % or more.

Various dispersing devices (defibration devices) can be used for dispersing the carboxylated cellulose nanofibers after the oxidation treatment. Specifically, for example, a defibration device such as a household mixer, an ultrasonic homogenizer, a high-pressure homogenizer, a twin-screw kneader or a stone mill can be used. In addition, defibration devices that are commonly used for domestic use or industrial production can be used. In particular, defibration devices with a stronger beating power, such as various homogenizers and refiners, more efficiently provide a dispersion of carboxylated cellulose nanofibers with small fiber diameters.

It is preferred that the carboxylated cellulose nanofibers after the oxidation treatment are dispersed after increasing the purity by repeated cycles of washing with water and solid-liquid separation. In addition, when non-defibrated components remain in the dispersion after dispersing treatment, it is preferred to remove such non-defibrated components by centrifugation or other techniques.

In the metal substitution step, substitution of metal ions by a contact between oxidized cellulose nanofibers containing a first metal in salt form and a salt of a second metal can be accomplished by adding a solution or solid of the salt of the second metal to a dispersion of oxidized cellulose nanofibers obtained through the above-described TEMPO-catalyzed oxidation or other oxidation methods, and stirring the resulting mixture.

The salt of the second metal can be a salt of a metal which conforms to characteristics desired to be imparted to the resulting metal-containing oxidized cellulose nanofibers. Specifically, the salt of the second metal is, for example when the first metal is sodium (i.e., when a sodium salt is used as the oxidizing agent), not particularly limited, and preferably can be a salt of at least one metal selected from the metals of Group 2 to Group 14 in Period 3 to Period 6 of the long periodic table, more preferably can be a salt of at least one metal selected from the group consisting of magnesium, aluminum, calcium, titanium, chromium, manganese, iron, cobalt, nickel, copper, zinc, silver, tin, barium, and lead, even more preferably can be a salt of at least one metal selected from the group consisting of aluminum, calcium, iron, cobalt, copper, zinc, and silver.

The second metal to be added to the dispersion of oxidized cellulose nanofibers can be in any salt form, such as halide, acetate, sulfate, or nitrate. In particular, from the perspective of improving the efficiency with which metal ions are substituted, the salt of the second metal is preferably a weak acid salt, more preferably an acetate.

Further, from the perspective of effective metal substitution on well-dispersed oxidized cellulose nanofibers, the dispersion of the oxidized cellulose nanofibers containing the first metal in salt form is preferably an aqueous dispersion. The concentration of the oxidized cellulose nanofibers in the dispersion is preferably 0.005% by mass or more, more preferably 0.01% by mass or more, even more preferably 0.05% by mass or more, and preferably 5% by mass or less, more preferably 3% by mass or less, even more preferably 2% by mass or less. If the concentration of the oxidized cellulose nanofibers is too low, it results in poor reaction efficiency and productivity. If the concentration of the oxidized cellulose nanofibers is too high, it results in high dispersion viscosity making uniform stirring difficult to perform.

The time of stirring the mixture of the oxidized cellulose nanofibers and the salt of the second metal can be a time sufficient for effecting metal ion substitution, e.g., from 1 hour to 10 hours. Stirring temperature can for example range from 10° C. to 50° C.

In the metal substitution step described above, when the oxidized cellulose nanofibers containing the first metal in salt form are contacted with the salt of the second metal in liquid, gelling of the oxidized cellulose nanofibers may occur. Even in such a case, performing the dispersing step after the optional washing step allows the resulting oxidized cellulose nanofibers to be well re-dispersed, so that a dispersion of metal-containing oxidized cellulose nanofibers having a number-average fiber diameter of 100 nm or less can be obtained.

[Washing Step]

In the optional washing step that follows the metal substitution step, the oxidized cellulose nanofibers after metal substitution are washed by any washing method known in the art, e.g., repeated cycles of centrifugation and replacement of supernatant with washing solution, or filtration and washing with a large quantity of washing solution.

Any washing solution can be used, e.g., water can be used. However, from the perspective of enhancing the efficiency of metal substitution of the resulting oxidized cellulose nanofiber obtained from the metal substitution step, it is preferred to perform washing first using an aqueous solution of the salt of the second metal as washing solution, and then using water as washing solution.

[Dispersing Step]

In the dispersing step, the oxidized cellulose nanofibers containing the second metal in salt form are dispersed using a known dispersing device (defibration device) such as a household mixer, an ultrasonic homogenizer, a high-pressure homogenizer, a twin-screw kneader, or a stone mill. Non-defibrated components are removed where necessary by centrifugation or other techniques to provide a dispersion of metal-containing oxidized cellulose nanofibers containing the second metal in salt form.

In the dispersion obtained as above, the metal-containing oxidized cellulose nanofibers containing the second metal in salt form are highly dispersed to an extent that the metal-containing oxidized cellulose nanofibers have a number-average fiber diameter of 100 nm or less, preferably 2 nm to 10 nm, more preferably 2 nm to 5 nm. Thus, with the dispersion, it is possible to impart desired characteristics to composite material or the like in a good manner even when the amount used is small.

The metal-containing oxidized cellulose nanofibers containing the second metal in salt form obtained in the manner described above preferably have a number-average fiber length of 50 nm to 2,000 nm, more preferably 70 nm to 1,500 nm, even more preferably 100 nm to 1,000 nm, particularly preferably 400 nm to 600 nm. When the number-average fiber length is 50 nm or more, it is possible to sufficiently increase the mechanical strength of the metal-containing oxidized cellulose nanofibers and composite material containing the metal-containing oxidized cellulose nanofibers and therefore to impart sufficiently high mechanical strength to a shaped article formed using an aggregate or composite material of the metal-containing oxidized cellulose nanofibers. When the number-average fiber length is 2,000 nm or less, the dispersibility of the metal-containing oxidized cellulose nanofibers can be ensured, so that the dispersion can be sufficiently enriched with the metal-containing oxidized cellulose nanofibers.

The number-average fiber length of the metal-containing oxidized cellulose nanofibers containing the second metal in salt form can be adjusted for example by changing the number-average fiber length of the raw material native cellulose and the oxidizing treatment conditions, the condition used for dispersing (defibrating) the carboxylated cellulose nanofibers after the oxidation treatment, and/or the condition used for dispersing (defibrating) the oxidized cellulose nanofibers containing the second metal in salt form after the metal substitution step. Specifically, by prolonging the time of dispersing treatment (defibrating treatment) or by increasing the energy applied during dispersing treatment (defibrating treatment), the number-average fiber length can be reduced.

The metal-containing oxidized cellulose nanofibers containing the second metal in salt form preferably have an average degree of polymerization (average number of glucose units in the cellulose molecules) of 100 to 2,000, more preferably 300 to 1,500, even more preferably 500 to 1,000, particularly preferably 500 to 700. When the average degree of polymerization is 100 or more, it is possible to sufficiently increase the mechanical strength of the metal-containing oxidized cellulose nanofibers and composite material containing the metal-containing oxidized cellulose nanofibers and therefore to impart sufficiently high mechanical strength to a shaped article formed using an aggregate or composite material of the metal-containing oxidized cellulose nanofibers. When the average degree of polymerization is 2,000 or less, the dispersibility of the metal-containing oxidized cellulose nanofibers can be ensured, so that the dispersion can be sufficiently enriched with the metal-containing oxidized cellulose nanofibers.

The average degree of polymerization of the metal-containing oxidized cellulose nanofibers containing the second metal in salt form can be adjusted for example by changing the average degree of polymerization of the raw material native cellulose and the oxidizing treatment conditions, the condition used for dispersing (defibrating) the carboxylated cellulose nanofibers after the oxidation treatment, and/or the condition used for dispersing (defibrating) the oxidized cellulose nanofibers containing the second metal in salt form after the metal substitution step.

<Second Production Method>

In the second production method, first, oxidized cellulose nanofibers containing a first metal in salt form, dispersed in a solvent, are contacted with a strong acid to substitute at least some, preferably all, of the ions of the first metal of the oxidized cellulose nanofibers by hydrogen atoms (hydrogen substitution step). Next, the oxidized cellulose nanofibers obtained from the above hydrogen substitution step are optionally washed (first washing step) and further dispersed in a dispersion medium (first dispersing step). Subsequently, the oxidized cellulose nanofibers in which the ions of the first metal have been substituted by hydrogen atoms, dispersed in a solvent, are contacted with a salt of a second metal to substitute at least some, preferably all of, the hydrogen atoms introduced in the hydrogen substitution step and the ions of the first metal which have not been substituted by hydrogen atoms (metal substitution step). Thereafter, the metal-containing oxidized cellulose nanofibers containing the second metal in salt form, obtained from the metal substitution step, are optionally washed (second washing step), and further dispersed in a dispersion medium (second dispersing step) to afford a dispersion of metal-containing oxidized cellulose nanofibers dispersed in the dispersion medium, the metal-containing oxidized cellulose nanofibers containing the second metal in salt form and having a number-average fiber diameter of 100 nm or less.

In this second production method, since the hydrogen substitution step precedes the metal substitution step, it is possible to increase the substitution of the first metal by the second metal compared to the first production method described above where the first metal is directly substituted by the second metal.

[Hydrogen Substitution Step]

The oxidized cellulose nanofibers containing the first metal in salt form in the hydrogen substitution step can be the oxidized cellulose nanofibers used in the above-described first production method.

In the hydrogen substitution step, substitution of ions of the first metal by hydrogen atoms by a contact between the oxidized cellulose nanofibers containing the first metal in salt form and a strong acid can be accomplished by adding a solution of a strong acid to a dispersion of oxidized cellulose nanofibers obtained by TEMPO-catalyzed oxidation or other oxidation methods, and stirring the resulting mixture.

Any strong acid can be used as long as it is capable of substituting ions of the first metal by hydrogen atoms (i.e., substituting the carboxyl groups of the oxidized cellulose nanofibers by carboxylic acid form). For example, it is possible to use hydrochloric acid, sulfuric acid or nitric acid, with hydrochloric acid being preferred.

The time of stirring the mixture of the oxidized cellulose nanofibers and strong acid can be a time sufficient for effecting substitution of metal ions by hydrogen atoms, e.g., from 10 minutes to 5 hours. Stirring temperature can for example range from 10° C. to 50° C.

[First Washing Step]

In the optional first washing step that follows the hydrogen substitution step, the hydrogen-substituted oxidized cellulose nanofibers are washed to remove strong acid by any washing method known in the art, e.g., repeated cycles of centrifugation and replacement of supernatant with washing solution, or filtration and washing with a large quantity of washing solution. In this way, by carrying out the first washing step, it is possible to remove strong acid and to prevent carboxyl groups of carboxylic acid form from remaining in the metal substitution step described later. As a result, in the metal substitution step, the hydrogen atoms introduced in the hydrogen substitution step and the ions of the first metal which have not been substituted by hydrogen atoms can be sufficiently substituted by ions of the second metal.

Any washing solution can be used in the first washing step, e.g., water can be used. However, from the perspective of enhancing the efficiency with which the carboxyl groups of the oxidized cellulose nanofibers are substituted by carboxylic acid form, it is preferred to perform washing first using a solution of strong acid as washing solution, and then using water as washing solution.

[First Dispersing Step]

In the first dispersing step, the oxidized cellulose nanofibers in which carboxyl groups are substituted by carboxylic acid form are dispersed in a dispersion medium such as water to afford a dispersion of oxidized cellulose nanofibers in which ions of the first metal are substituted by hydrogen atoms. In the first dispersing step, the oxidized cellulose nanofibers in which carboxyl groups are substituted by carboxylic acid form need not be completely dispersed in the dispersion medium using a known dispersing device (defibrating device) or the like.

[Metal Substitution Step]

The metal substitution step of the second production method can be performed in the same way as that of the first production method except that oxidized cellulose nanofibers in which ions of the first metal are substituted by hydrogen atoms are contacted with a salt of a second metal. A preferred mode of the metal substitution step of the second production method is also the same as that of the metal substitution step of the first production method.

[Second Washing Step and Second Dispersing Step]

The second washing step and the second dispersing step in the second production method can also be performed in the same way as those of the first production method described above. Further, preferred modes of the second washing step and the second dispersing step of the second production method are also the same as those of the washing step and the dispersing step of the first production method.

In the dispersion obtained as described above, the metal-containing oxidized cellulose nanofibers containing the second metal in salt form are highly dispersed to an extent that the metal-containing oxidized cellulose nanofibers have a number-average fiber diameter of 100 nm or less, preferably 2 nm to 10 nm, more preferably 2 nm to 5 nm. Thus, with the dispersion, it is possible to impart desired characteristics to composite material or the like in a good manner even when the amount used is small.

The metal-containing oxidized cellulose nanofibers containing the second metal in salt form obtained as described above preferably have a number-average fiber length of 50 nm to 2,000 nm, more preferably 70 nm to 1,500 nm, even more preferably 100 nm to 1,000 nm, particularly preferably 400 nm to 600 nm. When the number-average fiber length is 50 nm or more, it is possible to sufficiently increase the mechanical strength of the metal-containing oxidized cellulose nanofibers and composite material containing the metal-containing oxidized cellulose nanofibers and therefore to impart sufficiently high mechanical strength to a shaped article formed using an aggregate or composite material of the metal-containing oxidized cellulose nanofibers. When the number-average fiber length is 2,000 nm or less, the dispersibility of the metal-containing oxidized cellulose nanofibers can be ensured, so that the dispersion can be sufficiently enriched with the metal-containing oxidized cellulose nanofibers.

The number-average fiber length of the metal-containing oxidized cellulose nanofibers containing the second metal in salt form can be adjusted for example by changing the number-average fiber length of the raw material native cellulose and the oxidizing treatment conditions, the condition used for dispersing (defibrating) the carboxylated cellulose nanofibers after the oxidation treatment, and/or the condition used for dispersing (defibrating) the oxidized cellulose nanofibers containing the second metal in salt form after the metal substitution step. Specifically, by prolonging the time of dispersing treatment (defibrating treatment) or by increasing the energy applied during dispersing treatment (defibrating treatment), the number-average fiber length can be reduced.

The metal-containing oxidized cellulose nanofibers containing the second metal in salt form preferably have an average degree of polymerization (average number of glucose units in the cellulose molecules) of 100 to 2,000, more preferably 300 to 1,500, even more preferably 500 to 1,000, and particularly preferably 500 to 700. When the average degree of polymerization is 100 or more, it is possible to sufficiently increase the mechanical strength of the metal-containing oxidized cellulose nanofibers and composite material containing the metal-containing oxidized cellulose nanofibers and therefore to impart sufficiently high mechanical strength to a shaped article formed using an aggregate or composite material of the metal-containing oxidized cellulose nanofibers. When the average degree of polymerization is 2,000 or less, the dispersibility of the metal-containing oxidized cellulose nanofibers can be ensured, so that the dispersion can be sufficiently enriched with the metal-containing oxidized cellulose nanofibers.

The average degree of polymerization of the metal-containing oxidized cellulose nanofibers containing the second metal in salt form can be adjusted for example by changing the average degree of polymerization of the raw material native cellulose and the oxidizing treatment conditions, the condition used for dispersing (defibrating) the carboxylated cellulose nanofibers after the oxidation treatment, and/or the condition used for dispersing (defibrating) the oxidized cellulose nanofibers containing the second metal in salt form after the metal substitution step.

(Metal-Containing Oxidized Cellulose Nanofiber Dispersion)

The metal-containing oxidized cellulose nanofiber dispersion produced by the above-described production method comprises, for example, a dispersion medium such as water, and metal-containing oxidized cellulose nanofibers containing a metal other than sodium in salt form. In the dispersion, the metal-containing oxidized cellulose nanofibers are highly dispersed to an extent that the metal-containing oxidized cellulose nanofibers have a number-average fiber diameter of 100 nm or less, preferably 2 nm to 10 nm, more preferably 2 nm to 5 nm.

The metal other than sodium can be any metal and can be at least one metal selected from the group consisting of the metals of Group 2 to Group 14 in Period 3 to Period 6 of the long periodic table, preferably at least one metal selected from the group consisting of magnesium, aluminum, calcium, titanium, chromium, manganese, iron, cobalt, nickel, copper, zinc, silver, tin, barium, and lead, more preferably at least one metal selected from the group consisting of aluminum, calcium, iron, cobalt, copper, zinc, and silver.

As described above, the metal-containing oxidized cellulose nanofibers in the dispersion preferably have a number-average fiber length of 50 nm to 2,000 nm, more preferably 70 nm to 1,500 nm, even more preferably 100 nm to 1,000 nm, particularly preferably 400 nm to 600 nm.

The metal-containing oxidized cellulose nanofibers in the dispersion preferably have an average degree of polymerization of 100 to 2,000, more preferably 300 to 1,500, even more preferably 500 to 1,000, particularly preferably 500 to 700.

The metal-containing oxidized cellulose nanofiber dispersion can for example be directly dried when forming a functional membrane formed of metal-containing oxidized cellulose nanofibers (aggregate of metal-containing oxidized cellulose nanofibers). Alternatively, the metal-containing oxidized cellulose nanofiber dispersion can be first mixed with polymers or other materials to form composite materials which are used to manufacture various shaped articles. Further, the metal-containing oxidized cellulose nanofiber dispersion can be used when attaching metal-containing oxidized cellulose nanofibers to paper sheets, fibers, shaped articles or the like by coating, spraying, impregnating or other techniques while retaining the dispersibility of the metal-containing oxidized cellulose nanofibers. Such functional membranes and shaped articles formed using the metal-containing oxidized cellulose nanofiber dispersion, and such paper sheets, fibers and shaped articles having the metal-containing oxidized cellulose nanofibers attached may exhibit performance according to the type of the metal contained in the metal-containing oxidized cellulose nanofibers.

EXAMPLES

The following provides a more specific description of the present disclosure based on Examples, which however shall not be construed as limiting. In the following description, "%" and "part(s)" used to express quantities are by mass, unless otherwise specified.

In Examples, the carboxyl group amount of oxidized cellulose nanofibers, and the number-average fiber diameter, number-average fiber length, degree of polymerization and metal amount of metal-containing oxidized cellulose nanofibers were evaluated using the methods described below.

<Carboxyl Group Amount>

60 mL of a dispersion containing 0.5% to 1% by mass of oxidized cellulose nanofibers was prepared from a pulp sample of oxidized cellulose nanofibers precisely weighed in dry weight. Next, after the pH of the dispersion was adjusted to about 2.5 with 0.1M hydrochloric acid, changes in electrical conductivity were observed until the pH reached 11 by dropwise addition of 0.05M sodium hydroxide aqueous solution. The amount of carboxyl groups in the oxidized cellulose nanofibers was calculated using the following equation based on the volume (V) of sodium hydroxide consumed during the neutralization stage of the weak acid where changes in electrical conductivity are moderate:

Carboxyl group amount (mmol/g)={V (mL)×0.05}/ mass (g) of pulp sample

<Number-Average Fiber Diameter>

The metal-containing oxidized cellulose nanofiber dispersion was diluted to prepare a dispersion containing 0.0001% by mass of metal-containing oxidized cellulose nanofibers. The dispersion was dropped on mica and dried to form an observation sample. The sample was then observed using an atomic force microscope (Dimension Fast Scan AFM, Bruker; tapping mode), and in an image in which metal-containing oxidized cellulose nanofibers can be confirmed, 5 or more metal-containing oxidized cellulose nanofibers were measured for their fiber diameter and an average value was calculated.

<Number-Average Fiber Length>

The metal-containing oxidized cellulose nanofiber dispersion was diluted to prepare a dispersion containing 0.0001% by mass of metal-containing oxidized cellulose nanofibers. The resulting dispersion was dropped on mica and dried to form an observation sample. The sample was then observed using an atomic force microscope (Dimension Fast Scan AFM, Bruker; tapping mode), and in an image in which metal-containing oxidized cellulose nanofibers can be confirmed, 5 or more metal-containing oxidized cellulose nanofibers were measured for their fiber length and an average value was calculated.

<Degree of Polymerization>

The prepared metal-containing oxidized cellulose nanofibers were reduced with sodium borohydride to reduce remaining aldehyde groups in the molecules to their alcohols. Thereafter, the metal-containing oxidized cellulose nanofibers subjected to the reduction treatment were dissolved in a 0.5M copper ethylenediamine solution and the degree of polymerization was determined by the viscosity method. Specifically, the degree of polymerization was determined in accordance with "Isogai, A., Mutoh, N., Onabe, F., Usuda, M., "Viscosity measurements of cellulose/$SO^{2-}$-amine-dimethylsulfoxide solution", Sen'i Gakkaishi, 45, 299-306 (1989)."

The reduction treatment using sodium borohydride was carried out in order to prevent molecular weight reductions due to the beta elimination reaction that occurs in the process of dissolution into the copper ethylenediamine solution when aldehyde groups remained.

<Metal Amount>

Metals in the metal-containing oxidized cellulose nanofibers were qualified and quantified by ICP-AES. SPS5100 (SII NanoTechnology) was used for the measurement. In addition, the amount of each ion was quantifified by ion chromatography. For measurement, DX-500 (DIONEX) was used.

From the measurement results, the amounts of metals forming salts with carboxyl groups of the oxidized cellulose nanofibers were determined.

Example 1

<Preparation of Dispersion of Oxidized Cellulose Nanofibers>

1 g in dry weight of coniferous bleached kraft pulp, 5 mmol of sodium hypochlorite and 0.1 g (1 mmol) of sodium bromide as a co-oxidizing agent, and 0.016 g (1 mmol) of TEMPO as an oxidation catalyst were dispersed in 100 mL of water and stirred gently for 4 hours at room temperature to oxidize the coniferous bleached kraft pulp by TEMPO-catalyzed oxidation. The resulting oxidized pulp was washed with distilled water to afford TEMPO-oxidized pulp (oxidized cellulose). The amount of carboxyl groups of the TEMPO-oxidized pulp was 1.4 mmol/g.

Distilled water was then added to the never-dried TEMPO-oxidized pulp to prepare a dispersion having a solid content concentration of 0.1%. The dispersion was subjected to defibration treatment for 2 minutes at 7.5×1,000 rpm using a homogenizer (Physcotron, Microtec Co., Ltd.) and for 4 minutes using an ultrasonic homogenizer (Ultrasonic Generator, Nissei Corporation; V-LEVEL: 4, TIP: 26D) while ice-cooling the surroundings of the container. In this way, an aqueous dispersion containing carboxylated cellulose nanofibers as oxidized cellulose nanofibers was obtained. Thereafter, centrifugation (×12,000 g (120×100 rpm/g), 10 min, 12° C.) was performed using a centrifugal separator (M201-1VD, angle rotor: 50F-8AL, SAKUMA) to remove non-defibrated components from the aqueous dispersion of carboxylated cellulose nanofibers to afford 0.1% clear carboxylated cellulose nanofiber aqueous dispersion 1. The carboxylated cellulose nanofibers contained sodium (first metal) in salt form which was derived from the co-oxidizing agent.

<Preparation of Dispersion of Metal-Containing Oxidized Cellulose Nanofibers>

50 g of carboxylated cellulose nanofiber aqueous dispersion 1 was stirred, 18 g of a 0.1% copper (II) acetate aqueous solution was added as an aqueous solution of a second metal salt, and stirring was continued at room temperature for 3 hours (metal substitution step).

The carboxylated cellulose nanofibers gelled by the addition of the copper (II) acetate aqueous solution were then recovered by centrifugation (×12,000 g (120×100 rpm/g), 10 min, 12° C.) using a centrifugal separator (M201-1VD, angle rotor: 50F-8AL, SAKUMA), and the recovered carboxylated cellulose nanofibers were washed with 0.1% copper (II) acetate aqueous solution and then with a large quantity of distilled water (washing step).

50 ml of distilled water was then added and the dispersion was subjected to ultrasonic treatment for 2 minutes using an ultrasonic homogenizer (Ultrasonic Generator, Nissei Corporation; V-LEVEL: 4, TIP: 26D) while ice-cooling the surroundings of the container to disperse metal-substituted carboxylated cellulose nanofibers. Centrifugation (×12,000 g (120×100 rpm/g), 10 min, 12° C.) was performed using a centrifugal separator (M201-1VD, angle rotor: 50F-8AL, SAKUMA) to remove non-defibrated components to afford a 0.1% clear aqueous dispersion of metal-containing carboxylated cellulose nanofibers (dispersing step).

<Evaluation of Dispersion of Metal-Containing Oxidized Cellulose Nanofibers>

Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side to the viewer. This confirmed that the metal-containing carboxylated cellulose nanofibers were well dispersed in water. The relationship between birefringence and dispersibility is disclosed in WO2009/069641, for example.

The metal-containing carboxylated cellulose nanofibers had a number-average fiber diameter of 3.13 nm and a number-average fiber length of 550 nm, confirming that the metal-containing carboxylated cellulose nanofibers were dispersed in water at the microfibril level. The metal-containing carboxylated cellulose nanofibers had an average degree of polymerization of 600.

Further, as a result of ICP-AES measurement, it was found that copper (Cu) was present in the metal-containing carboxylated cellulose nanofibers at an amount one-half that in moles of the carboxyl groups of the carboxylated cellulose nanofibers, and the amount of sodium was not greater than 1 ppm by mass. Further, as a result of quantitation of the ion amount by ion chromatography, it was found that the amount of acetate ions was not greater than 0.5 ppm by mass. These results suggest that sodium ions present in the carboxylated cellulose nanofibers of the metal-containing carboxylated cellulose nanofibers are substituted by copper ions and one copper ion is bound per two carboxyl groups.

Example 2

<Preparation of Dispersion of Oxidized Cellulose Nanofibers>

0.1% carboxylated cellulose nanofiber aqueous dispersion 1 was prepared as in Example 1.

<Preparation of Dispersion of Metal-Containing Oxidized Cellulose Nanofibers>

A 0.1% aqueous dispersion of metal-containing carboxylated cellulose nanofibers was prepared as in Example 1 except that 19 g of 0.1% cobalt (II) acetate aqueous solution was used instead of 18 g of 0.1% copper (II) acetate aqueous solution in the metal substitution step, and that 0.1% cobalt (II) acetate aqueous solution was used instead of 0.1% copper (II) acetate aqueous solution in the washing step.

<Evaluation of Dispersion of Metal-Containing Oxidized Cellulose Nanofibers>

Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side to the viewer. This confirmed that the metal-containing carboxylated cellulose nanofibers were well dispersed in water.

The metal-containing carboxylated cellulose nanofibers had a number-average fiber diameter of 3.15 nm and a number-average fiber length of 560 nm, confirming that the metal-containing carboxylated cellulose nanofibers were dispersed in water at the microfibril level. The metal-containing carboxylated cellulose nanofibers had an average degree of polymerization of 650.

Further, as a result of ICP-AES measurement, it was found that cobalt (Co) was present in the metal-containing carboxylated cellulose nanofibers at an amount one-half that in moles of the carboxyl groups of the carboxylated cellulose nanofibers, and the amount of sodium was not greater than 1 ppm by mass. Further, as a result of quantitation of the ion amount by ion chromatography, it was found that the amount of acetate ions was not greater than 0.5 ppm by mass. These results suggest that sodium ions present in the carboxylated cellulose nanofibers of the metal-containing carboxylated cellulose nanofibers are substituted by cobalt ions and one cobalt ion is bound per two carboxyl groups.

Example 3

<Preparation of Dispersion of Oxidized Cellulose Nanofibers>

0.1% carboxylated cellulose nanofiber aqueous dispersion 1 was prepared as in Example 1.

<Preparation of Dispersion of Metal-Containing Oxidized Cellulose Nanofibers>

A 0.1% aqueous dispersion of metal-containing carboxylated cellulose nanofibers was prepared as in Example 1 except that 26 g of 0.1% aluminum (III) chloride hexahydrate aqueous solution was used instead of 18 g of 0.1% copper (II) acetate aqueous solution in the metal substitution step, and that 0.1% aluminum (III) chloride hexahydrate aqueous solution was used instead of 0.1% copper (II) acetate aqueous solution in the washing step.

<Evaluation of Dispersion of Metal-Containing Oxidized Cellulose Nanofibers>

Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side to the viewer. This confirmed that the metal-containing carboxylated cellulose nanofibers were well dispersed in water.

The metal-containing carboxylated cellulose nanofibers had a number-average fiber diameter of 3.14 nm and a number-average fiber length of 500 nm, confirming that the metal-containing carboxylated cellulose nanofibers were dispersed in water at the microfibril level. The metal-containing carboxylated cellulose nanofibers had an average degree of polymerization of 550.

Further, as a result of ICP-AES measurement, it was found that aluminum (Al) was present in the metal-containing carboxylated cellulose nanofibers at an amount one-third that in moles of the carboxyl groups of the carboxylated cellulose nanofibers, and the amount of sodium was not greater than 1 ppm by mass. Further, as a result of quantitation of the ion amount by ion chromatography, it was found that the amount of chloride ions was not greater than 0.1 ppm by mass. These results suggest that sodium ions present in the carboxylated cellulose nanofibers of the metal-containing carboxylated nanofibers are substituted by aluminum ions and one aluminum ion is bound per three carboxyl groups.

Example 4

<Preparation of Dispersion of Oxidized Cellulose Nanofibers>

0.1% carboxylated cellulose nanofiber aqueous dispersion 1 was prepared as in Example 1.

<Preparation of Dispersion of Hydrogen-Substituted Oxidized Cellulose Nanofibers>

To 100 mL of carboxylated cellulose nanofiber aqueous dispersion 1 was added 1 mL of 1M hydrochloric acid under stirring to adjust the pH to 1. Stirring was continued for 60 minutes (hydrogen substitution step).

Thereafter, the carboxylated cellulose nanofibers gelled by the addition of hydrochloric acid were recovered by centrifugation (×12,000 g (120×100 rpm/g), 10 min, 12° C.) using a centrifugal separator (M201-1VD, angle rotor: 50F-8AL, SAKUMA), and the recovered carboxylated cellulose nanofibers were washed with 1M hydrochloric acid and then with a large quantity of distilled water (first washing step).

Next, 100 mL of distilled water was added to afford 0.1% hydrogen-substituted carboxylated cellulose nanofiber aqueous dispersion 1 in which hydrogen-substituted carboxylated cellulose nanofibers are dispersed (first dispersing step). 90% or more of the carboxyl groups present on the surface of the hydrogen-substituted carboxylated cellulose nanofibers were substituted by carboxylic acid form as measured by FT-IR (FT/IR-6100, JASCO Corporation) in accordance with Biomacromolecules, 2011, vol. 12, pp. 518-522.

<Preparation of Dispersion of Metal-Containing Oxidized Cellulose Nanofibers>

50 g of 0.1% hydrogen-substituted carboxylated cellulose nanofiber aqueous dispersion 1 was stirred, 18 g of a 0.1% copper (II) acetate aqueous solution was added as an aqueous solution of a second metal salt, and stirring was continued at room temperature for 3 hours (metal substitution step).

The carboxylated cellulose nanofibers gelled by the addition of the copper (II) acetate aqueous solution were then recovered by centrifugation (×12,000 g (120×100 rpm/g), 10 min, 12° C.) using a centrifugal separator (M201-1VD, angle rotor: 50F-8AL, SAKUMA), and the recovered carboxylated cellulose nanofibers were washed with 0.1% copper (II) acetate aqueous solution and then with a large quantity of distilled water (second washing step).

50 ml of distilled water was then added and the dispersion was subjected to ultrasonic treatment for 2 minutes using an ultrasonic homogenizer (Ultrasonic Generator, Nissei Corporation; V-LEVEL: 4, TIP: 26D) while ice-cooling the surroundings of the container to disperse metal-substituted carboxylated cellulose nanofibers. Centrifugation (×12,000 g (120×100 rpm/g), 10 min, 12° C.) was performed using a centrifugal separator (M201-1VD, angle rotor: 50F-8AL, SAKUMA) to remove non-defibrated components to afford a 0.1% clear aqueous dispersion of metal-containing carboxylated cellulose nanofibers (second dispersing step).

<Evaluation of Dispersion of Metal-Containing Oxidized Cellulose Nanofibers>

Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side to the viewer. This confirmed that the metal-containing carboxylated cellulose nanofibers were well dispersed in water.

The metal-containing carboxylated cellulose nanofibers had a number-average fiber diameter of 3.13 nm and a number-average fiber length of 530 nm, confirming that the metal-containing carboxylated cellulose nanofibers were dispersed in water at the microfibril level. The metal-containing carboxylated cellulose nanofibers had an average degree of polymerization of 580.

Further, as a result of ICP-AES measurement, it was found that copper (Cu) was present in the metal-containing carboxylated cellulose nanofibers at an amount one-half that in moles of the carboxyl groups of the carboxylated cellulose nanofibers, and the amount of sodium was not greater than 1 ppm by mass. Further, as a result of quantitation of the ion amount by ion chromatography, it was found that the amount of acetate ions was not greater than 0.5 ppm by mass and the amount of chlorine ions was not greater than 0.1 ppm by mass. These results suggest that sodium ions present in the carboxylated cellulose nanofibers of the metal-containing carboxylated nanofibers are substituted by copper ions and one copper ion is bound per two carboxyl groups.

Example 5

<Preparation of Dispersion of Oxidized Cellulose Nanofibers>

0.1% carboxylated cellulose nanofiber aqueous dispersion 1 was prepared as in Example 4.

<Preparation of Dispersion of Hydrogen-Substituted Oxidized Cellulose Nanofibers>

0.1% hydrogen-substituted carboxylated cellulose nanofiber aqueous dispersion 1 was prepared as in Example 4.

<Preparation of Dispersion of Metal-Containing Oxidized Cellulose Nanofibers>

A 0.1% aqueous dispersion of metal-containing carboxylated cellulose nanofibers was prepared as in Example 4 except that 19.5 g of 0.1% zinc (II) acetate aqueous solution was used instead of 18 g of 0.1% copper (II) acetate aqueous solution in the metal substitution step, and that 0.1% zinc (II) acetate aqueous solution was used instead of 0.1% copper (II) acetate aqueous solution in the second washing step.

<Evaluation of Dispersion of Metal-Containing Oxidized Cellulose Nanofibers>

Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side to the viewer. This confirmed that the metal-containing carboxylated cellulose nanofibers were well dispersed in water.

The metal-containing carboxylated cellulose nanofibers had a number-average fiber diameter of 3.15 nm and a number-average fiber length of 520 nm, confirming that the metal-containing carboxylated cellulose nanofibers were dispersed in water at the microfibril level. The metal-containing carboxylated cellulose nanofibers had an average degree of polymerization of 560.

Further, as a result of ICP-AES measurement, it was found that zinc (Zn) was present in the metal-containing carboxylated cellulose nanofibers at an amount one-half that in moles of the carboxyl groups of the carboxylated cellulose nanofibers, and the amount of sodium was not greater than 1 ppm by mass. Further, as a result of quantitation of the ion amount by ion chromatography, it was found that the amount of acetate ions was not greater than 0.5 ppm by mass and the amount of chlorine ions was not greater than 0.1 ppm by mass. These results suggest that sodium ions present in the carboxylated cellulose nanofibers of the metal-containing carboxylated nanofibers are substituted by zinc ions and one zinc ion is bound per two carboxyl groups.

Example 6

<Preparation of Dispersion of Oxidized Cellulose Nanofibers>

0.1% carboxylated cellulose nanofiber aqueous dispersion 1 was prepared as in Example 4.

<Preparation of Dispersion of Hydrogen-Substituted Oxidized Cellulose Nanofibers>

0.1% hydrogen-substituted carboxylated cellulose nanofiber aqueous dispersion 1 was prepared as in Example 4.

<Preparation of Dispersion of Metal-Containing Oxidized Cellulose Nanofibers>

A 0.1% aqueous dispersion of metal-containing carboxylated cellulose nanofibers was prepared as in Example 4 except that 19 g of 0.1% cobalt (II) acetate aqueous solution was used instead of 18 g of 0.1% copper (II) acetate aqueous solution in the metal substitution step, and that 0.1% cobalt (II) acetate aqueous solution was used instead of 0.1% copper (II) acetate aqueous solution in the second washing step.

<Evaluation of Dispersion of Metal-Containing Oxidized Cellulose Nanofibers>

Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side to the viewer. This confirmed that the metal-containing carboxylated cellulose nanofibers were well dispersed in water.

The metal-containing carboxylated cellulose nanofibers had a number-average fiber diameter of 3.15 nm and a number-average fiber length of 550 nm, confirming that the metal-containing carboxylated cellulose nanofibers were dispersed in water at the microfibril level. The metal-containing carboxylated cellulose nanofibers had an average degree of polymerization of 600.

Further, as a result of ICP-AES measurement, it was found that cobalt (Co) was present in the metal-containing carboxylated cellulose nanofibers at an amount one-half that in moles of the carboxyl groups of the carboxylated cellulose nanofibers, and the amount of sodium was not greater than 1 ppm by mass. Further, as a result of quantitation of the ion amount by ion chromatography, it was found that the amount of acetate ions was not greater than 0.5 ppm by mass and the amount of chlorine ions was not greater than 0.1 ppm by mass. These results suggest that sodium ions present in the carboxylated cellulose nanofibers of the metal-containing carboxylated nanofibers are substituted by cobalt ions and one cobalt ion is bound per two carboxyl groups.

Example 7

<Preparation of Dispersion of Oxidized Cellulose Nanofibers>

0.1% carboxylated cellulose nanofiber aqueous dispersion 1 was prepared as in Example 4.

<Preparation of Dispersion of Hydrogen-Substituted Oxidized Cellulose Nanofibers>

0.1% hydrogen-substituted carboxylated cellulose nanofiber aqueous dispersion 1 was prepared as in Example 4.

<Preparation of Dispersion of Metal-Containing Oxidized Cellulose Nanofibers>

A 0.1% aqueous dispersion of metal-containing carboxylated cellulose nanofibers was prepared as in Example 4 except that 19 g of 0.1% calcium (II) acetate monohydrate aqueous solution was used instead of 18 g of 0.1% copper (II) acetate aqueous solution in the metal substitution step, and that 0.1% calcium (II) acetate monohydrate aqueous solution was used instead of 0.1% copper (II) acetate aqueous solution in the second washing step.

<Evaluation of Dispersion of Metal-Containing Oxidized Cellulose Nanofibers>

Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side to the viewer. This confirmed that the metal-containing carboxylated cellulose nanofibers were well dispersed in water.

The metal-containing carboxylated cellulose nanofibers had a number-average fiber diameter of 3.14 nm and a number-average fiber length of 550 nm, confirming that the metal-containing carboxylated cellulose nanofibers were dispersed in water at the microfibril level. The metal-containing carboxylated cellulose nanofibers had an average degree of polymerization of 600.

Further, as a result of ICP-AES measurement, it was found that calcium (Ca) was present in the metal-containing carboxylated cellulose nanofibers at an amount one-half that in moles of the carboxyl groups of the carboxylated cellulose nanofibers, and the amount of sodium was not greater than 1 ppm by mass. Further, as a result of quantitation of the ion amount by ion chromatography, it was found that the amount of acetate ions was not greater than 0.5 ppm by mass and the amount of chlorine ions was not greater than 0.1 ppm by mass. These results suggest that sodium ions present in the carboxylated cellulose nanofibers of the metal-containing carboxylated nanofibers are substituted by calcium ions and one calcium ion is bound per two carboxyl groups.

Example 8

<Preparation of Dispersion of Oxidized Cellulose Nanofibers>

0.1% carboxylated cellulose nanofiber aqueous dispersion 1 was prepared as in Example 4.

<Preparation of Dispersion of Hydrogen-Substituted Oxidized Cellulose Nanofibers>

0.1% hydrogen-substituted carboxylated cellulose nanofiber aqueous dispersion 1 was prepared as in Example 4.

<Preparation of Dispersion of Metal-Containing Oxidized Cellulose Nanofibers>

A 0.1% aqueous dispersion of metal-containing carboxylated cellulose nanofibers was prepared as in Example 4 except that 18 g of 0.1% silver (I) acetate aqueous solution was used instead of 18 g of 0.1% copper (II) acetate aqueous solution in the metal substitution step, and that 0.1% silver (I) acetate aqueous solution was used instead of 0.1% copper (II) acetate aqueous solution in the second washing step.

<Evaluation of Dispersion of Metal-Containing Oxidized Cellulose Nanofibers>

Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side from the viewer. This confirmed that the metal-containing carboxylated cellulose nanofibers were well dispersed in water.

The metal-containing carboxylated cellulose nanofibers had a number-average fiber diameter of 3.13 nm and a number-average fiber length of 540 nm, confirming that the metal-containing carboxylated cellulose nanofibers were dispersed in water at the microfibril level. The metal-containing carboxylated cellulose nanofibers had an average degree of polymerization of 590.

Further, as a result of ICP-AES measurement, it was found that silver (Ag) was present in the metal-containing carboxylated cellulose nanofibers at an amount equal to that in moles of the carboxyl groups of the carboxylated cellulose nanofibers, and the amount of sodium was not greater than 1 ppm by mass. Further, as a result of quantitation of the ion amount by ion chromatography, it was found that the amount of acetate ions was not greater than 0.5 ppm by mass and the amount of chlorine ions was not greater than 0.1 ppm by mass. These results suggest that sodium ions present in the carboxylated cellulose nanofibers of the metal-containing carboxylated nanofibers are substituted by silver ions and one silver ion is bound per one carboxyl group.

Example 9

<Preparation of Dispersion of Oxidized Cellulose Nanofibers>
0.1% carboxylated cellulose nanofiber aqueous dispersion 1 was prepared as in Example 4.
<Preparation of Dispersion of Hydrogen-Substituted Oxidized Cellulose Nanofibers>
0.1% hydrogen-substituted carboxylated cellulose nanofiber aqueous dispersion 1 was prepared as in Example 4.
<Preparation of Dispersion of Metal-Containing Oxidized Cellulose Nanofibers>
A 0.1% aqueous dispersion of metal-containing carboxylated cellulose nanofibers was prepared as in Example 4 except that 26 g of 0.1% aluminum (III) chloride hexahydrate aqueous solution was used instead of 18 g of 0.1% copper (II) acetate aqueous solution in the metal substitution step, and that 0.1% aluminum (III) chloride hexahydrate aqueous solution was used instead of 0.1% copper (II) acetate aqueous solution in the second washing step.
<Evaluation of Dispersion of Metal-Containing Oxidized Cellulose Nanofibers>
Birefringence was observed when the resulting aqueous dispersion of metal-containing carboxylated cellulose nanofibers was placed between two polarizing plates arranged in crossed Nicols and the aqueous dispersion was allowed to move in between the polarizing plates while directing light from the opposite side to the viewer. This confirmed that the metal-containing carboxylated cellulose nanofibers were well dispersed in water.
The metal-containing carboxylated cellulose nanofibers had a number-average fiber diameter of 3.15 nm and a number-average fiber length of 490 nm, confirming that the metal-containing carboxylated cellulose nanofibers were dispersed in water at the microfibril level. The metal-containing carboxylated cellulose nanofibers had an average degree of polymerization of 530.
Further, as a result of ICP-AES measurement, it was found that aluminum (Al) was present in the metal-containing carboxylated cellulose nanofibers at an amount one-third that in moles of the carboxyl groups of the carboxylated cellulose nanofibers, and the amount of sodium was not greater than 1 ppm by mass. Further, as a result of quantitation of the ion amount by ion chromatography, it was found that the amount of acetate ions was not greater than 0.5 ppm by mass and the amount of chlorine ions was not greater than 0.1 ppm by mass. These results suggest that sodium ions present in the carboxylated cellulose nanofibers of the metal-containing carboxylated cellulose nanofibers are substituted by aluminum ions and one aluminum ion is bound per three carboxyl groups.

It can be seen from Examples 1 to 9 that the disclosed production method can provide a dispersion of metal-containing oxidized cellulose nanofibers with superior dispersibility, which is applicable to various uses.

INDUSTRIAL APPLICABILITY

According to the present disclosure, it is possible to provide a dispersion of metal-containing oxidized cellulose nanofibers with superior dispersibility, which is applicable to various uses.

The invention claimed is:
1. A method of producing a dispersion of metal-containing oxidized cellulose nanofibers having a number-average fiber diameter of 2 nm or more and 100 nm or less and an average degree of polymerization of 100 to 2,000, the method comprising:
   contacting oxidized cellulose nanofibers containing a first metal in salt form, dispersed in a solvent in a concentration of 0.005% by mass or more and 0.1% by mass or less, with an acid to substitute ions of the first metal contained in salt form by hydrogen atoms;
   contacting the oxidized cellulose nanofibers in which the ions of the first metal have been substituted by hydrogen atoms, dispersed in a solvent, with a salt of a second metal other than the first metal to provide metal-containing oxidized cellulose nanofibers containing the second metal in salt form; and
   the metal-containing oxidized cellulose nanofibers have a number-average fiber length of 400 nm to 600 nm.
2. The method of producing a dispersion of metal-containing oxidized cellulose nanofibers of claim 1, wherein the oxidized cellulose nanofibers are carboxylated cellulose nanofibers.
3. The method of producing a dispersion of metal-containing oxidized cellulose nanofibers of claim 1, wherein the first metal is sodium, and
   the second metal is at least one metal selected from the group consisting of metals of Group 2 to Group 14 in Period 3 to Period 6 of the long periodic table.
4. The method of producing a dispersion of metal-containing oxidized cellulose nanofibers of claim 1, wherein the first metal is sodium, and
   the second metal is at least one metal selected from the group consisting of magnesium, aluminum, calcium, titanium, chromium, manganese, iron, cobalt, nickel, copper, zinc, silver, tin, barium, and lead.
5. The method of producing a dispersion of metal-containing oxidized cellulose nanofibers of claim 1, wherein the first metal is sodium, and
   the second metal is at least one metal selected from the group consisting of aluminum, calcium, iron, cobalt, copper, zinc, and silver.
6. The method of producing a dispersion of metal-containing oxidized cellulose nanofibers of claim 1, wherein the solvent is water.

* * * * *